G. WALKER.
Rotary Churns.
No. 139,345.
Patented May 27, 1873.
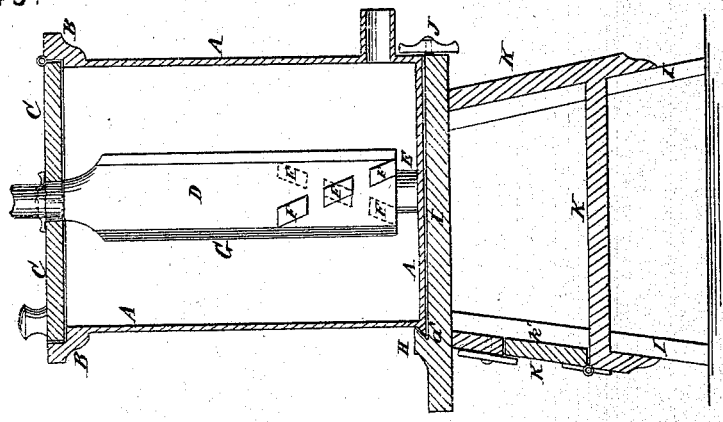
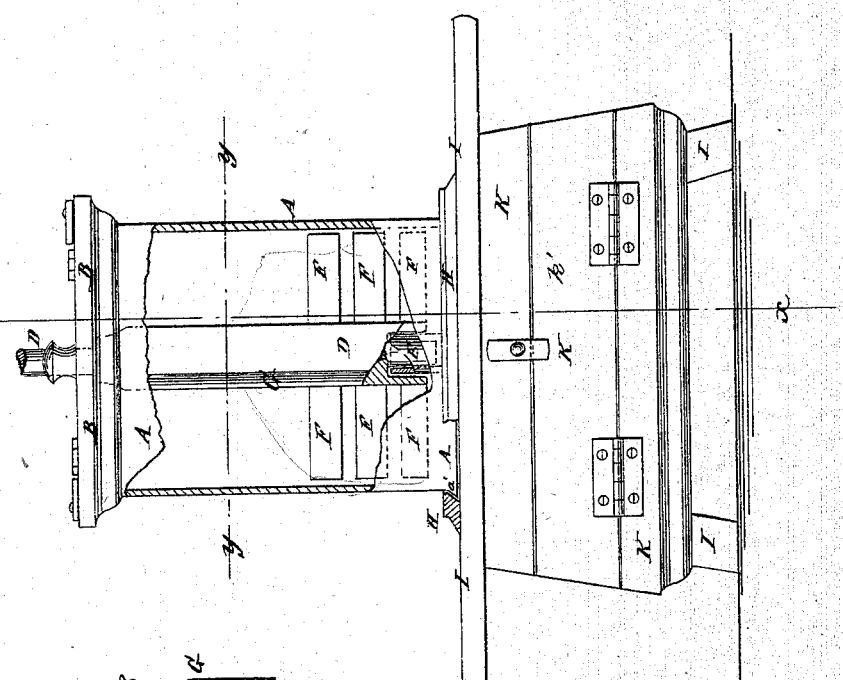
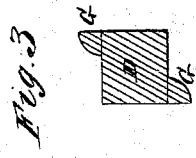
Witnesses:
A. W. Almquist
C. Sedgwick
Inventor:
G. Walker
per ____
Attorneys.

UNITED STATES PATENT OFFICE.

GEORGE WALKER, OF WHITLEY'S POINT, ILLINOIS.

IMPROVEMENT IN ROTARY CHURNS.

Specification forming part of Letters Patent No. 139,345, dated May 27, 1873; application filed February 8, 1873.

*To all whom it may concern:*

Be it known that I, GEORGE WALKER, of Whitley's Point, in the county of Moultrie and State of Illinois, have invented a new and useful Improvement in Churn, of which the following is a specification:

Figure 1 is a front view of my improved churn, part being broken away to show the construction. Fig. 2 is a detail vertical section of the same taken through the line $x\ x$, Fig. 1. Fig. 3 is a detail cross-section of the dasher-shaft taken through the line $y\ y$, Fig. 1.

Similar letters of reference indicate corresponding parts.

The invention consists in the improvement of churns, as hereinafter described and pointed out in the claim.

A represents the body of the churn, which is made of galvanized sheet-iron, and of rectangular form. To the upper edge of the churn-body A is secured a wooden rim, B, which serves as a seat for the cover C. The cover C is made in two parts, one or both of which may be hinged at the outer edge to the rim B, and which have half-round notches formed in the middle part of their inner edges to receive and form a bearing for the dasher-shaft D. The lower end of the dasher-shaft D revolves in a step, E, attached to the center of the bottom of the churn-body A, and said shaft may be revolved by any convenient mechanism connected with its upper end. To the opposite sides of the lower part of the shaft D are secured the ends of three arms, F, which are arranged in an inclined position, and with each upper arm a little in advance of the next lower arm, as shown in Fig. 2. By this arrangement, as the dasher is revolved forward the tendency is to force the milk downward, which, by the bottom and sides of the churn, and by the angles between said bottom and sides, is thrown into violent agitation, bringing the butter in a very short time. The effect of the dasher F is increased by vertical ribs G attached to the side of the opposite or diagonal angles of said shaft D, as shown in Figs. 1 and 3. Around three sides of the bottom of the churn-body A are formed flanges $a'$, which enter grooves in the inner edges of the cleats H, attached to the table I, upon which the churn stands when being used, and where it is secured in place by a button, J, or other convenient fastening.

By this construction the churn-body A can be readily detached and set in a tub of cold water to cool the milk in warm weather, and in cold weather it can be set in a tub of warm water, or upon the stove, to warm the milk, thus enabling the milk to be readily brought to the proper temperature without pouring cold or warm water into it. The lower part of the table I is inclosed with a casing, K, having a door, K', in its forward side, thus forming a convenient receptacle for the butter-bowl, ladle, and other necessary articles, when not required for use.

To gather the butter the lid is raised, and the churn rinsed down in the ordinary manner, and again closed. The dasher D F G is then turned backward, which gathers the butter into two balls, and works into said balls all the butter-specks, leaving the milk entirely free from butter, thus largely increasing the amount of butter obtained.

Having thus described my invention, I claim as new and desire to secure by Letters Patent—

A dasher-shaft having vertical ribs and reversely-inclined arms, as and for the purpose described.

GEORGE WALKER.

Witnesses:
HEZEKIAH PLACE,
EDWARD C. HARRISON.